(12) United States Patent
Dullenkopf et al.

(10) Patent No.: US 8,398,493 B2
(45) Date of Patent: Mar. 19, 2013

(54) TORQUE TRANSMISSION DEVICE

(75) Inventors: Dirk Dullenkopf, Munich (DE);
Wolfgang Kornprobst, Toeging (DE);
Helmut Schuermann, Maxdorf (DE);
Patrick Tichelmann, Buettelborn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/353,096

(22) Filed: Jan. 18, 2012

(65) Prior Publication Data

US 2012/0115621 A1 May 10, 2012

Related U.S. Application Data

(63) Continuation of application No. PCT/EP2010/004607, filed on Jul. 28, 2010.

(30) Foreign Application Priority Data

Aug. 19, 2009 (DE) .......................... 10 2009 038 039

(51) Int. Cl.
*F16D 3/62* (2006.01)

(52) U.S. Cl. .......................................... 464/69; 464/903

(58) Field of Classification Search .................... 464/69, 464/93–96, 181, 903, 182
See application file for complete search history.

(56) References Cited

U.S. PATENT DOCUMENTS

| 3,016,723 A | 1/1962 | Gondek |
| 4,187,699 A | 2/1980 | Weible |
| 4,460,345 A | 7/1984 | Chivari |
| 4,792,320 A * | 12/1988 | Nickel ........................... 464/181 |
| 5,601,493 A * | 2/1997 | Nakazono et al. ............. 464/181 |
| 5,683,300 A * | 11/1997 | Yasui et al. .................... 464/181 |
| 7,083,521 B2 | 8/2006 | Takei |
| 2006/0058104 A1* | 3/2006 | Kirschey ......................... 464/93 |
| 2010/0162785 A1 | 7/2010 | Bächle et al. |

FOREIGN PATENT DOCUMENTS

| DE | 38 34 919 A1 | 4/1990 |
| DE | 44 14 384 A1 | 10/1994 |
| DE | 10 2004 029 989 A1 | 1/2006 |
| DE | 10 2004 061 786 A1 | 7/2006 |
| DE | 10 2005 042 839 A1 | 3/2007 |
| DE | 10 2008 034 214 A1 * | 1/2010 |
| EP | 1 818 556 A1 | 8/2007 |
| GB | 221981 | 9/1924 |
| GB | 321999 | 11/1929 |
| WO | WO 81/01317 A1 | 5/1981 |

OTHER PUBLICATIONS

German Search Report dated Jun. 30, 2010 including partial English-language translation (Nine (9) pages).
International Search Report dated Dec. 23, 2010 including English-language translation (Six (6) pages).

* cited by examiner

*Primary Examiner* — Gregory Binda
(74) *Attorney, Agent, or Firm* — Crowell & Moring LLP

(57) ABSTRACT

A torque transmission device includes a shaft, particularly a drive shaft for a drive train of a vehicle, and at least one coupling element which is connected with an end of the shaft. The shaft and the at least one coupling element each consists completely or at least partly of a fiber-reinforced plastic material.

19 Claims, 8 Drawing Sheets

TORQUE TRANSMISSION DEVICE

CROSS-REFERENCE TO RELATED APPLICATIONS

This application is a continuation of PCT International Application No. PCT/EP2010/004607, filed Jul. 28, 2010, which claims priority under 35 U.S.C. §119 from German Patent Application No. DE 10 2009 038 039.6, filed Aug. 19, 2009, the entire disclosures of which are herein expressly incorporated by reference.

BACKGROUND AND SUMMARY OF THE INVENTION

The present invention relates to a torque transmission device.

Vehicles comprising a front engine and a rear or all-wheel drive have a drive shaft that leads from the transmission output to the input of the rear axle gear. At present, drive shafts of this type normally consist of steel. They have a correspondingly high weight and contribute considerably to the overall-mass moment of inertia of the vehicle.

It is an object of the invention to provide a torque transmission device, particularly a drive shaft, for a drive train of a vehicle, which has a lower weight than conventional drive shaft arrangements.

This and other objects are achieved by a torque transmission device having a shaft, particularly a "drive shaft" for a drive train of a vehicle, and at least one coupling or flange element that is connected with an end of the shaft. The coupling or flange element is provided for coupling the shaft with another component, such as an output flange of a vehicle transmission or a drive flange of an axle gear. The term "shaft" therefore particularly comprises shafts generating positive vehicle drive. The shaft, as well as the at least one coupling element, consists at least partly, but preferably completely, of a fiber-reinforced plastic material. The plastic material may particularly be a carbon-fiber-reinforced and/or a fiber-glass-reinforced plastic material. The shaft and the coupling element do not necessarily have to consist of one and the same plastic material but may be made of different materials.

According to a further development of the invention, the at least one flange element has several arm-type elements which are uniformly spaced from one another in a circumferential direction of the flange element. The flange element may, for example, have a star-type or triangular shape with three "connection points" mutually spaced by 120 degrees respectively in the circumferential direction. A hole may be provided at each of the "connection points". The holes are preferably situated on a common hole circle. Naturally, more than three connection points, for example, four, five or six connection points can also be provided.

According to a further development of the invention, the at least one flange element has a ring-type section which is pushed onto the shaft or onto the shaft end. Arm-type elements project radially outward from the ring-type section.

According to a further development of the invention, two groups of arm-type elements are provided which, in a front view of the shaft, are each situated in pairs in a row and are spaced with respect to one another in the axial direction of the shaft. The two groups of arm-type elements can be an integral component of one and the same flange element; i.e. they may be connected with one and the same ring-type section. As an alternative, two separate flange elements with one group of arm-type elements respectively may also be provided. In a front view of the shaft, the two flange elements are aligned such that the arm-type elements are each situated in pairs in a row.

According to a further development of the invention, the ring-type section of the flange element or the ring-type sections of the flange elements forms or form a press fit with the shaft. At their ring-type sections, the flange element or elements can additionally be glued to the shaft or be form-lockingly connected with it in the circumferential direction, so that also high torques can be transmitted from the flange element or flange elements to the shaft and vice-versa.

For illustrating a particularly tight press fit, a "circumferential bandage" can additionally be provided which is wound onto the outer circumference of the ring-type section of the flange element or the ring-type sections of the flange elements. The circumferential bandage may also be made of a fiber-reinforced plastic material. As an alternative, the circumferential bandage may also be made of a different material. It is generally used for pressing the ring-type section or ring-type sections to the shaft, which permits the transmission of high torques.

According to a further development of the invention, a respective $n^{th}$ arm of the first flange element is connected by way of a rod-type or pin-type tension element of a first group of tension elements with an assigned $n^{th}$ arm of the second flange element. The rod-type or pin-type tension elements are therefore arranged parallel to the longitudinal direction of the shaft.

According to a further development of the invention, a second group of tension elements is provided, which can also be constructed in a pin-type, rod-type or roller-type fashion. Like the first group of tension elements, the second group of tension elements is mutually spaced in a uniform manner in a circumferential direction of the flange element or of the flange elements, in which case, viewed in the circumferential direction of the at least one flange element, a first tension element is in each case followed by a second tension element, and vice-versa.

According to a further development of the invention, coupling elements are provided, each of the first tension elements being coupled by way of at least one coupling element with the second tension element that is next in one circumferential direction, and being coupled by way of at least one coupling element with the second tension element that is next in the opposite circumferential direction.

This type of arrangement is known from the assignee's earlier, not pre-published German patent application DE 10 2008 034 214.9, the content of which is expressly incorporated by reference herein, and a portion of which is added herein with respect to the description of FIGS. 1-6.

Thus, it can be provided that each of the coupling elements mutually couples a first tension element and a second tension element adjacent to the first coupling element in the circumferential direction. The coupling elements can be tensioned by use of assigned tension elements. The coupling elements can wrap around the tension elements at least over a partial circumference of the tension elements. More than two coupling elements, particularly a plurality of coupling elements, can be mounted on each of the tension elements.

Analogous to the arrangement described in German patent document DE 10 2008 034 214.9, the first group of tension elements can be coupled with the second group of tension elements also exclusively by way of the coupling elements in the rotating direction.

The individual coupling elements may also be foamed or cast into an elastic coupling element connecting the individual coupling elements.

Furthermore, the rod-type, pin-type or roller-type tension elements may each be equipped at their ends with a step, a disk or the like, which prevents or prevent a slipping-down of the coupling elements off the concerned tension element.

The coupling elements may completely or partially consist of a fiber glass material. In particular, the coupling elements may consist of a plastic material that is reinforced by fibers, particularly glass fibers. The coupling elements may have the shape of oval rings or slings. Finally, the tension elements may have a roller-type, bolt-type or bush-type shape.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 7:
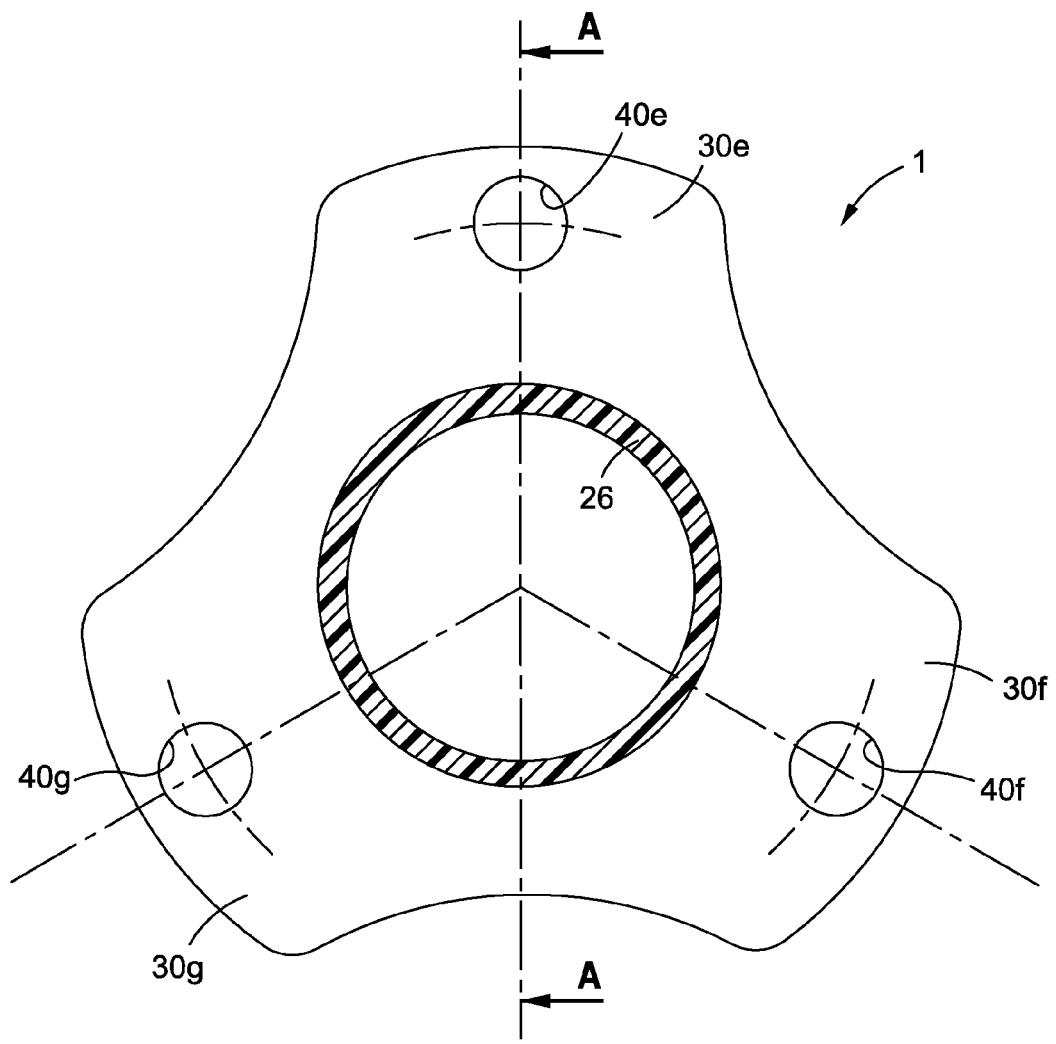
FIG. 7 is a front view illustrating a basic principle of a torque transmission device according to the invention.
Figure 8:
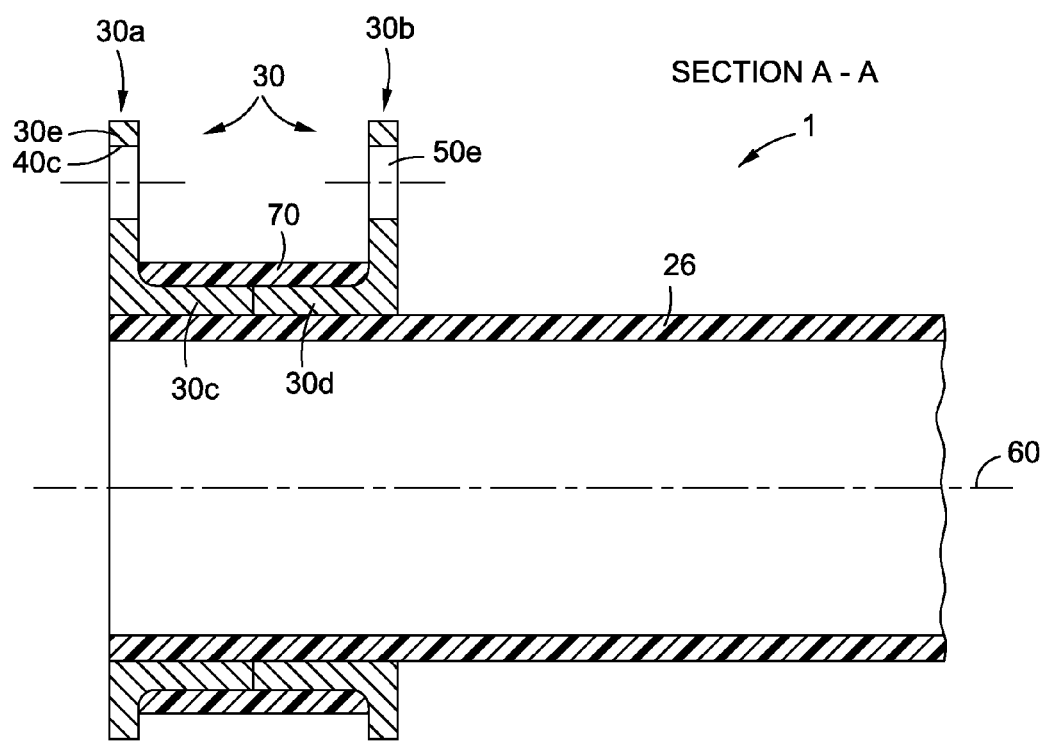
FIG. 8 is a cross-sectional view taken along intersection line A-A illustrated in FIG. 7.

FIGS. 7 and 8 respectively illustrate a torque transmission device 1, which has a shaft made of a fiber-reinforced plastic material as well as a flange 30 pressed onto the shaft 26. The flange 30 is formed by a first flange element 30a and a second flange element 30b.

The two flange elements 30a, 30b each have a ring-type (cylindrical) section 30c, 30d. The ring-type sections 30c, 30d are each pushed onto the outer circumference of an end of the shaft 26 and form a press fit with the shaft 26. In addition, the flange 30a, 30b have three arm-type elements 30e, 30f, 30g (compare FIG. 7), each mutually spaced by 120 degrees in the circumferential direction. One hole or one bore 40e, 40f, 40g or 50e, 50f, 50g, respectively, is provided in the arm-type elements 30e, 30f, 30g. Bore 50e is shown in FIG. 8. In addition, the arm-type elements 30e, 30f, 30g project substantially radially from the ring-type sections 30c, 30d. Moreover, arm-type elements 30e, 30f, 30g are arranged mutually spaced apart from one another in an axial direction and axially aligned relative to one another in a circumferential direction such that the bores 40e, 40f, 40g formed in the arm-type elements 30e, 30f, 30g axially align with one another.

As illustrated in FIG. 8, the two flange elements 30a, 30b are arranged such that, viewed in the axial direction 60, their arm-type elements and their assigned bores respectively, for example, the two bores 40e, 50e, are each in a row (axially aligned) with respect to one another.

As illustrated in FIG. 8, a "circumferential bandage" 70 is wound onto the outer circumference of the ring-type sections 30c, 30d of the two flange elements 30a, 30b. The circumferential bandage reinforces the press fit that the two flange elements 30a, 30b form with the shaft 26 so that particularly high torques can be transmitted. The two flange elements 30a, 30b and their ring-type sections 30c, 30d respectively can additionally be adhered or glued to the outer circumference of the shaft and/or may be rotationally coupled by way of form-locking elements, such as a spline profile or the like.

Roller-type, bolt-type or bush-type tension elements can be inserted in each case into mutually assigned bores 40e, 50e, etc. of the two flange elements 30a, 30b, similar to the tension elements 6, 7, 8 shown and described in the incorporated German patent application DE 10 2008 034 214.9, a portion of whose content is set forth below in the description of FIGS. 1-6.

Analogous to German patent application 10 2008 034 214.9, a first group of tension elements, which are inserted in the bores of the two flange elements 30a, 30b, can be connected by way of sling-type or loop-type coupling elements with a second group of tension elements.

Figure 1:
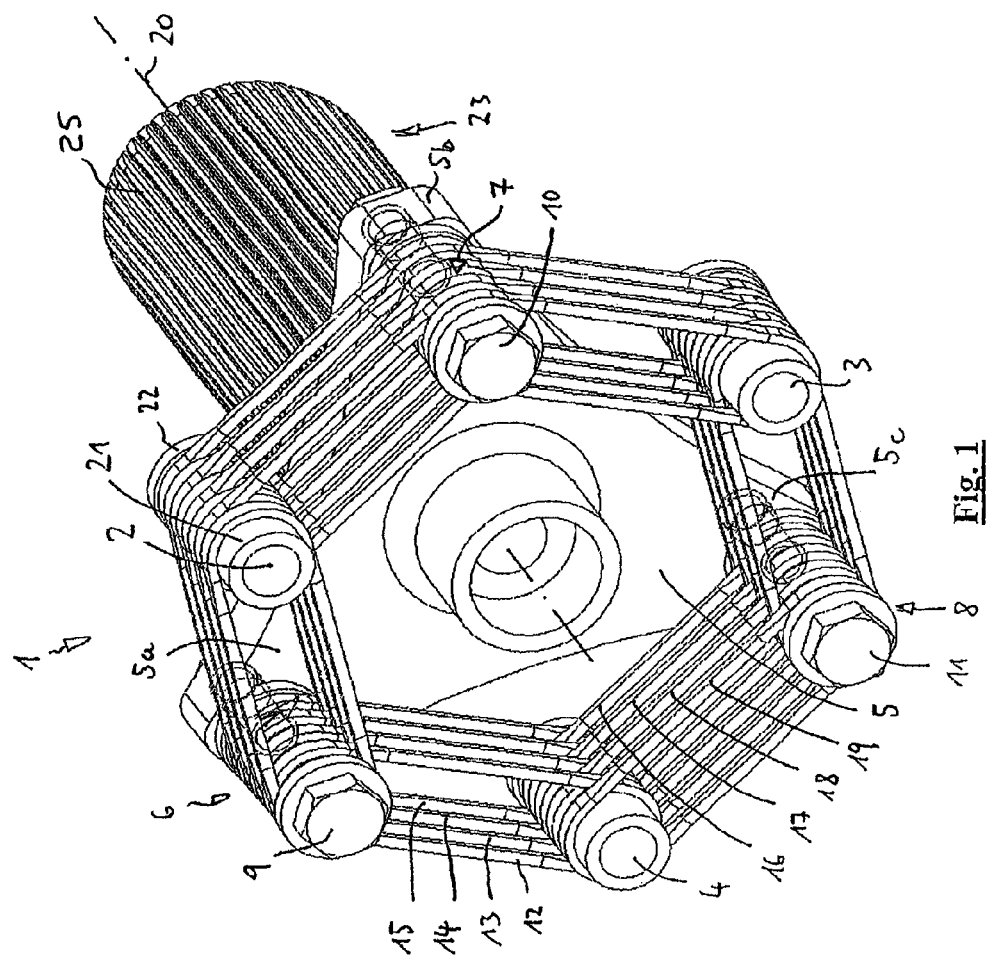
FIG. 1 is a perspective view of a torque transmission device.

FIG. 1 illustrates a torque transmission device 1 having a drive element not illustrated here in detail, and first tension elements 2, 3, 4, which are mutually spaced in a uniform manner, i.e. at 120° from one another, in a circumferential direction of the torque transmission device 1. The torque transmission device 1 also has an output element 5 which, in turn, has three arms 5a, 5b, 5c at which, in each case, a second tension element 6, 7, 8 is attached, which projects on one side. A first tension element 2, 3, 4 is therefore in each case arranged between two second tension elements 6, 7, 8, and vice versa. The total of six tension elements form a uniform hexagon.

The second tension elements 6, 7, 8 are screwed to the arms 5a, 5b of the output element 5 by means of the screws 9, 10, 11. In this case, the screws 9, 10, 11 penetrate the second tension elements 6, 7, 8.

As illustrated in FIG. 1, the tension elements 2, 3, 4 as well as 6, 7, 8 have the shape of rollers or bolts or bushes.

In order to permit a torque transmission from the first tension elements 2, 3, 4 connected with the drive element not shown here in detail to the second tension elements 6, 7, 8 connected with the output element 5, and vice-versa, each of the tension elements 2, 3, 4, 6, 7, 8 is connected by way of several coupling element with two tension elements respectively which are adjacent in the circumferential direction. For example, the first tension element 4 is connected by way of four coupling elements 12, 13, 14, 15 with the second tension element 6 and by way of also four additional coupling elements 16, 17, 18, 19 with the second tension element 8.

As illustrated in FIG. 1, the coupling elements 12-19 have the shape of oval rings or loops. In each case the coupling elements therefore wind around a partial circumference of approximately 180° of the tension elements 4, 6 and 4, 8 respectively. The coupling elements may be made completely or at least partially of glass fiber materials and, correspondingly, also have a certain elasticity in the axial direction 20 of the torque transmission device 1. This means that the first tension elements 2-4 can shift to a certain extent relative to the second tension elements 6, 8, in which case the coupling elements 15-19 deform correspondingly.

The torque transmission device 1 therefore permits a torque transmission in both rotating directions. However, in addition, the coupling elements 15-19 also permit a certain axial displacement of the drive element with respect to the output element or vice-versa as well as a certain tilting motion of the drive element with respect to the output element 5.

As illustrated in FIG. 1 on the example of the first tension element 2, shoulders or disks 21, 22, which operate as securing elements and prevent that the assigned coupling elements slide off the bush-type or roller-type first tension element 2, are provided at the face-sides of the tension elements, here particularly of the first tension element 2.

The tension elements 2-4 and 6-8 respectively may be made of hardened steel. As illustrated in FIG. 1 by means of the second tension elements 6-8, the tension elements can be over-mounted; i.e., be connected with the drive element and the output element 5 respectively only at one of their two face sides. During a torque transmission from the drive element to the output element or vice-versa, a deformation or bending of the tension elements 2-4 and 6-8 respectively therefore occurs to a certain extent, whereby a relatively uniform load distribution to the individual tension elements and the coupling elements connecting the tension elements is ensured.

For reasons of completeness, the journal-type end 23 of the output element 5 should also be mentioned, which is connected here with a serration profile 25. The journal-type end can, for example, be pushed into an end piece of a drive shaft, which end piece is provided with an internal serration profile. The serration thereby permits a relative displacement of the output element 5 with respect to the drive shaft.

Figure 2:
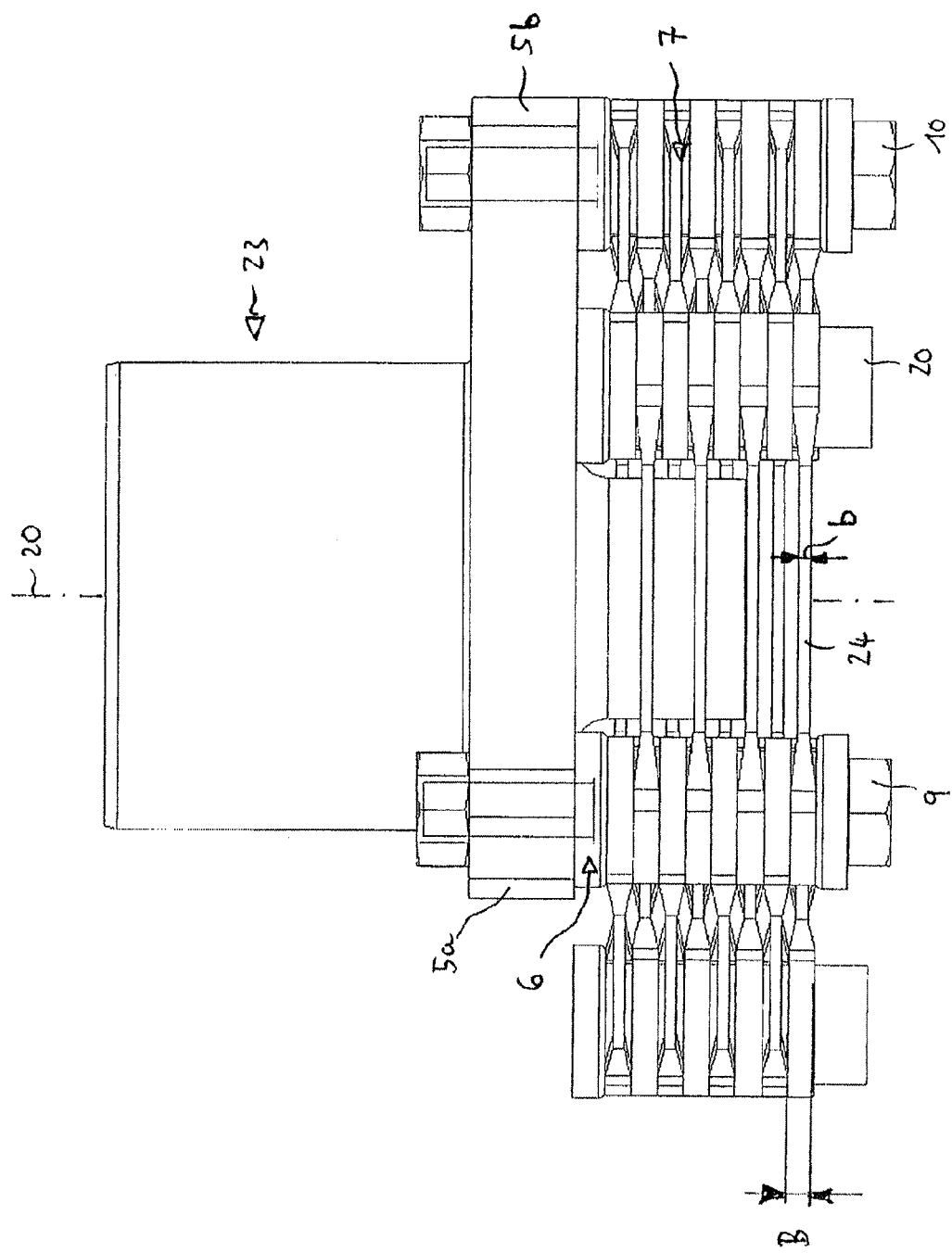
FIG. 2 is a top view of the torque transmission device.

FIG. 2 is a top view of the torque transmission device of FIG. 1. It is clearly illustrated in this representation that, in those sections which wind around the tension elements, viewed in the axial direction 20, the coupling elements have a larger width than in the "free" sections between the individual tension elements. Concretely, for example, a coupling element 24 has a larger width B in the area of the tension element 6 than in the area between the tension element 6 and the tension element 2, where the width of the coupling element 24 amounts only to b. As a result of the smaller width in the area between the adjacent tension elements, it is achieved that the coupling elements have a better bending capacity and thereby allow better axial relative displacements of the drive element with respect to the output element or tilting movements of the drive element with respect to the output element, and vice-versa.

Figure 3:
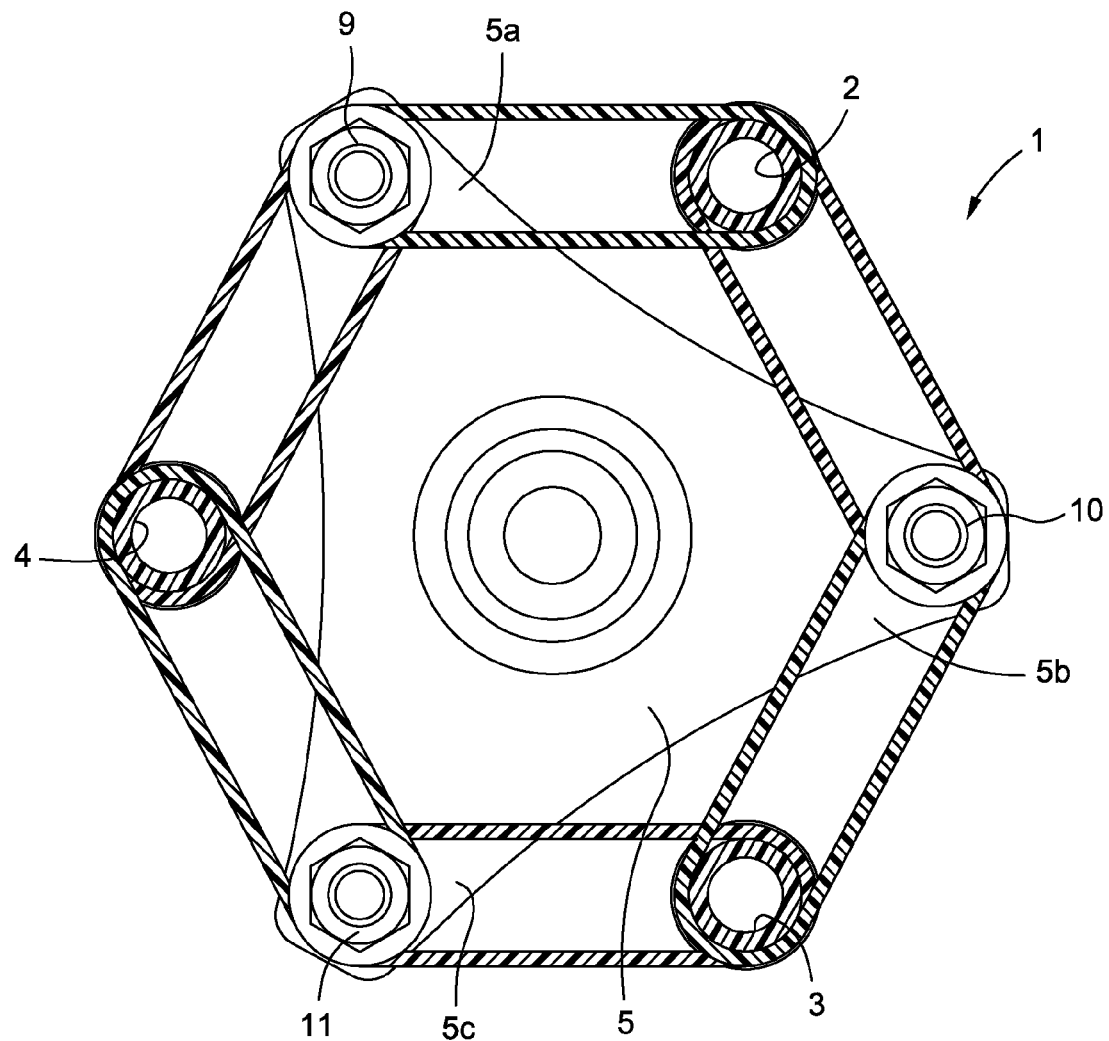
FIG. 3 is a front view of the torque transmission device of FIG. 1 viewed from the drive side.

FIG. 3 is a front view of the torque transmission device 1 viewed from the drive element not shown here in detail in the direction of the output element 5.

Figure 4:
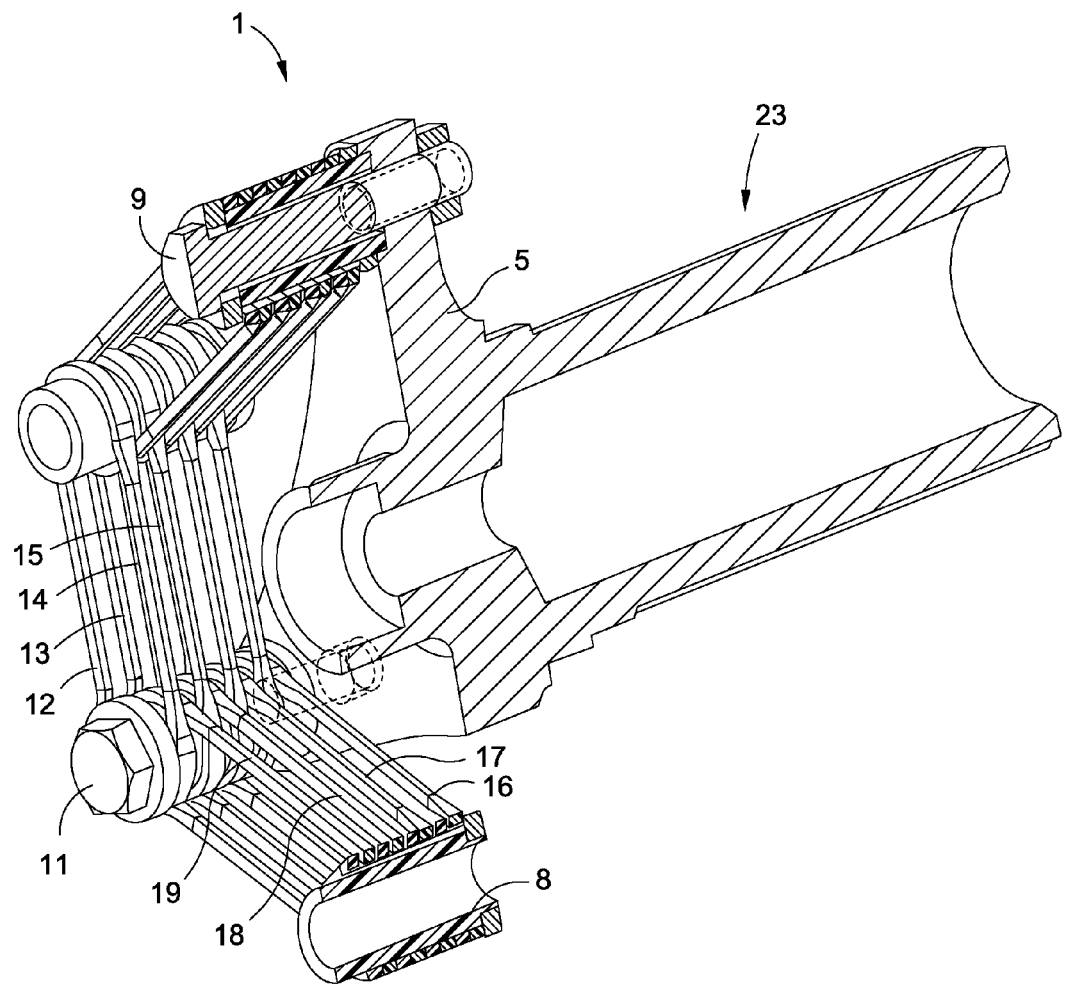
FIG. 4 is a cross-sectional view of the torque transmission device of FIG. 1 in a perspective representation.

FIG. 4 is a cross-sectional view of the torque transmission device 1 of FIG. 1. It can clearly be recognized that the tension elements are bush-type tension elements, which is visible particularly on tension element 8.

Figure 5:
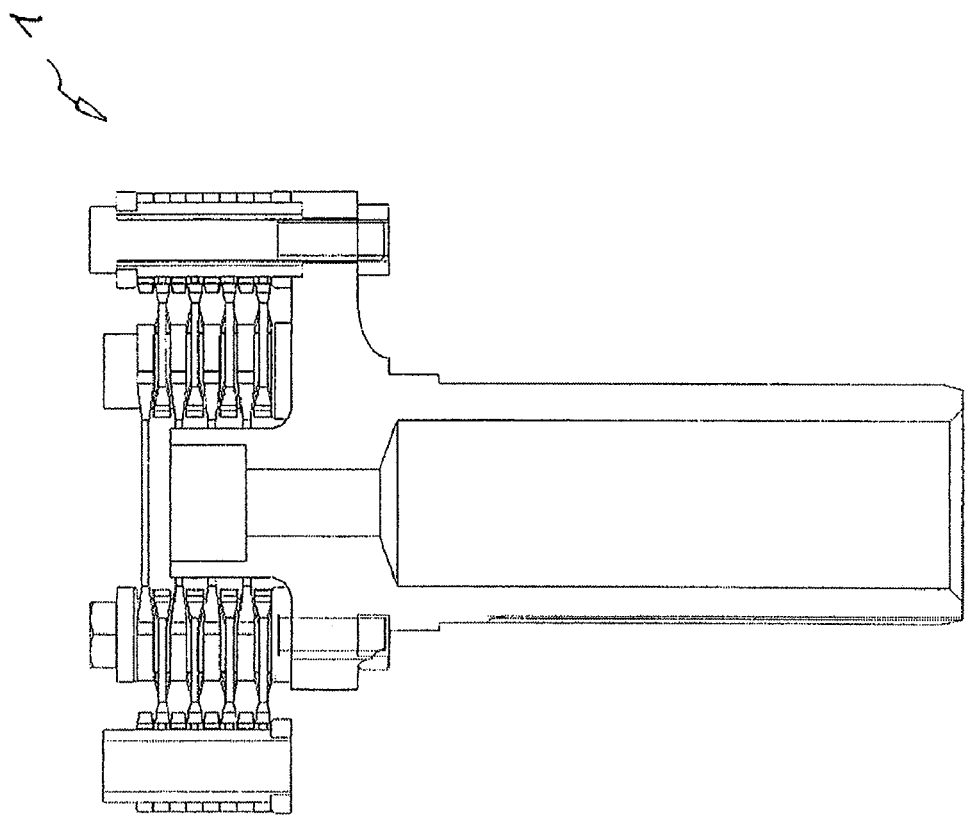
FIG. 5 is a further top view of the torque transmission device of FIG. 1.

FIG. 5 is a further top view of the torque transmission device 1, showing in a particularly clear manner the different widths of the coupling elements in the area of the tension elements, on the one hand, and in the area between the tension elements, on the other hand.

Figure 6:
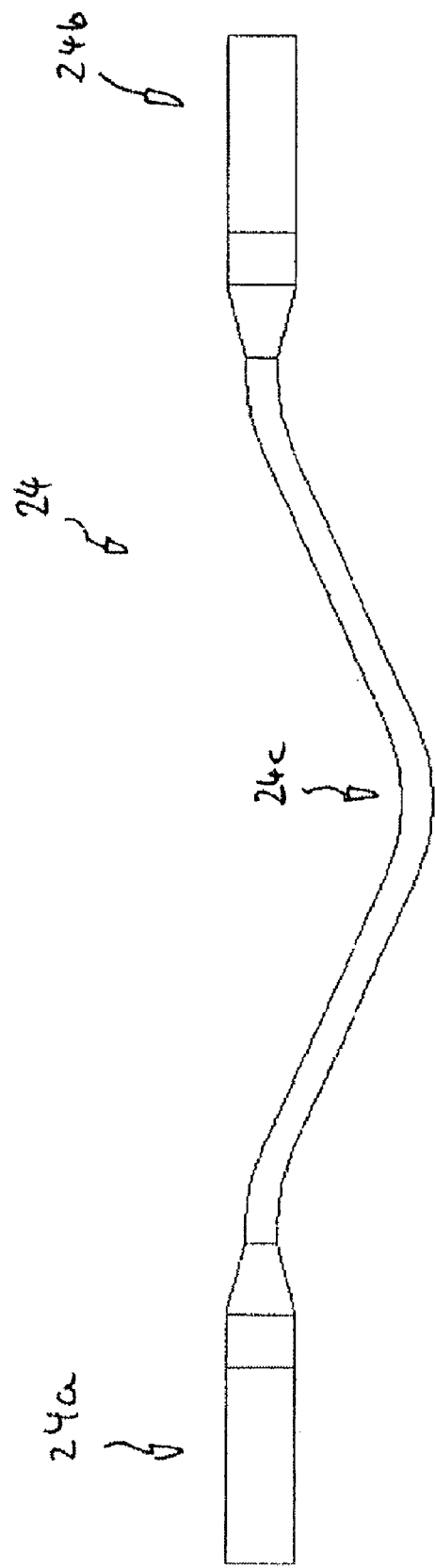
FIG. 6 is a view of a custom-shaped coupling element.

FIG. 6 shows an embodiment of a coupling element. The coupling element shown in a lateral view in FIG. 6 also has the shape of an oval ring or of a loop. In contrast to the coupling elements, which are described in connection with FIG. 1-FIG. 5, the coupling element 24 of FIG. 6, however, is not plane but has a curved construction in the area between sections 24a, 24b, which in the mounted condition wind around assigned tension elements. The curved center area 24c, which, in addition, has a smaller width than the "wind-around sections 24a, 24b", thereby permits a still better deformation of the coupling element 24 during an axial displacement or a tilting of the drive element relative to the output element.

The torque transmission device has a first and a second group of "tension elements" which may have the shape of rollers, bolts or bushes. The tension elements of the first group are fixedly arranged with respect of the drive element and are mutually spaced in a uniform manner in a circumferential direction of the drive element.

The second group of tension elements are fixedly arranged with respect to the output element and are mutually spaced in a uniform manner in a circumferential direction of the output element. The tension elements are arranged such that, viewed in the circumferential direction of the drive element and the output element respective, a first tension element is in each case followed by a second tension element and vice-versa. If, for example, three first tension elements and three second tension elements are provided, viewed in the axial direction of the torque transmission device, the tension elements may be arranged at the or in the area of the corner points of an imaginary uniform hexagon.

In order to permit a torque transmission from the first tension elements to the second tension elements respectively, these tension elements are coupled according to the invention by way of "coupling elements". Each of the first tension elements is coupled by way of at least one coupling element with the second tension element that is next in one circumferential direction and by way of at least one coupling element with the second tension element that is next in the opposite circumferential direction.

Each of the coupling elements, in each case, thereby mutually couples a first tension element and a second tension element that is adjacent thereto in the circumferential direction.

The coupling elements may have the shape of oval rings or loops which each partially wind around a pair of neighboring tension elements.

The coupling elements may be such that they can transmit only tensile forces but no compressive forces. However, because of the symmetrical arrangement of the coupling elements, a torque transmission in both rotating directions will nevertheless still be possible.

According to a further development, the coupling elements are "tensioned" by way of the assigned tension elements. In this case, the coupling elements wind around at least a partial circumference of the tension elements.

For the transmission of greater torques, it may be provided that more than two coupling elements, particularly a plurality of coupling elements are mounted on each of the tension elements.

The first tension elements may be coupled with the second tension elements exclusively by way of the coupling elements. However, as an alternative, it is also conceivable that the coupling elements and/or the first and/or the second tension elements are surrounded by foam or cast in by means of a plastic material or by means of rubber, similarly to the so-called Hardy disks. At one or both face-side end areas of the tension elements, a shoulder, a collar, a disk or another securing device may in each case be provided which prevents a sliding of the coupling elements off the respective tension element.

Tests have shown that very high forces and therefore very large torques can be transmitted by means of coupling elements consisting completely or at least partly of synthetic fibers, such as carbon fibers or glass fibers. Because of the elasticity of glass fibers, coupling elements made of glass fibers also permit a certain relative displacement of the drive element with respect to the output element in the axial direction.

For reducing the wear phenomena as a result of relative movements between the tension elements and the coupling elements resting on the latter or mounted over the latter, the tension elements may be made of a material that reduces frictional wear or may be coated with a material that reduces frictional wear. Lubricants, such as polytetrafluor ethylene, graphite or titanium oxide, for example, can be used for this purpose. These incorporated wear-reducing substances form a thin separating lubricating film between the tension elements and the coupling elements.

The tension elements may be made of hardened steel. The tension elements may be over-mounted, i.e. connected only at one of their faces with the drive element or the assigned output element. In the case of an over-mounted arrangement, the tension elements are subjected to a torque transmission bending stress and have to be designed correspondingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A torque transmission device, comprising:
   a shaft of a motor vehicle, wherein the shaft is a drive shaft for a drive train of the motor vehicle;
   at least one coupling element connected with an end of the shaft;
   wherein the shaft and the at least one coupling element are each composed at least partly of a fiber-reinforced plastic material, and wherein the at least one coupling element has a ring-type section operatively configured to engage over an outer circumference of the shaft, wherein the at least one coupling element comprises a plurality of arm-type elements extending radially outward from the ring-type section, the arm-type elements being uniformly spaced with respect to one another in a circumferential direction; and
   a wrap-around ring operatively configured to exert a radial force exteriorly onto the ring-type section of the at least one coupling element.

2. The torque transmission device according to claim 1, wherein the drive shaft and the at least one coupling element are each composed completely of the fiber-reinforced plastic material.

3. The torque transmission device according to claim 1, wherein the coupling element has only three arm-type elements.

4. The torque transmission device according to claim 3, wherein each of the arm-type elements has a hole extending there through, the holes of the arm-type elements being arranged on a common circle extending through the holes.

5. The torque transmission device according to claim 1, wherein each of the arm-type elements has a hole extending there through, the holes of the arm-type elements being arranged on a common circle extending through the holes.

6. The torque transmission device according to claim 1, wherein two coupling elements are provided, the ring-type section of each coupling element extending toward one another; and
   wherein the arm-type elements of the two coupling elements are arranged mutually spaced apart from one another in an axial direction and axially aligned relative to one another in a circumferential direction such that holes formed in the arm-type elements axially align with one another.

7. The torque transmission device according to claim 6, wherein an nth arm of a first of the two coupling elements is connected via one of a roller, pin, and bush tension element of a first group of tension elements with an associated nth arm of a second of the two coupling elements; and
   wherein the tension elements are arranged substantially parallel to a longitudinal direction of the shaft.

8. The torque transmission device according to claim 7 further comprising:
   a second group of tension elements uniformly spaced with respect to one another in a circumferential direction of at least one coupling element; and
   wherein a first tension element of the first group of tension elements being alternatively arranged in the circumferential direction with second tension elements of the second group of tension elements.

9. The torque transmission device according to claim 8, further comprising:
   tension coupling devices, each of the first tension devices being coupled by way of at least one tension coupling device with an adjacent tension device in one circumferential direction, and being coupled by way of at least one further tension coupling device with an adjacent second tension device in an opposite circumferential direction.

10. The torque transmission device according to claim 9, wherein each of the tension coupling devices mutually couples a first tension device and a second tension device adjacent thereto in a circumferential direction.

11. The torque transmission device according to claim 9, wherein the coupling devices are tensioned via assigned tension elements, the tension coupling devices winding around the assigned tension elements at least over a partial circumference of the assigned tension elements.

12. The torque transmission device according to claim 9, wherein more than two coupling devices are mounted on each of the tension elements.

13. The torque transmission device to claim 9, wherein the first group of tension elements is coupled with the second group of tension elements only via the tension coupling devices.

14. The torque transmission device according to claim 9, wherein the tension coupling devices are made at least partly of glass fibers.

15. The torque transmission device according to claim 9, wherein the tension coupling devices are made of a plastic material reinforced by glass fibers.

16. The torque transmission device according to claim 9, wherein the tension coupling devices are shaped as an oval ring.

17. The torque transmission device according to claim 7, further comprising a step or a disk provided, in each case, in a face-side end area of the tension elements, the step or disk preventing a slipping-down of the coupling elements off of an associated tension element.

18. The torque transmission device according to claim 7, wherein the tension elements have a roller, bolt, or bush shape.

19. The torque transmission device according to claim 1, wherein the wrap-around ring is composed of a fiber-reinforced plastic material.

* * * * *